US011565415B2

(12) United States Patent
Kim

(10) Patent No.: US 11,565,415 B2
(45) Date of Patent: Jan. 31, 2023

(54) METHOD OF TRACKING USER POSITION USING CROWD ROBOT, TAG DEVICE, AND ROBOT IMPLEMENTING THEREOF

(71) Applicant: LG ELECTRONICS INC., Seoul (KR)

(72) Inventor: Jungsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 16/754,325

(22) PCT Filed: Jul. 2, 2019

(86) PCT No.: PCT/KR2019/008084
§ 371 (c)(1),
(2) Date: Apr. 7, 2020

(87) PCT Pub. No.: WO2021/002499
PCT Pub. Date: Jan. 7, 2021

(65) Prior Publication Data
US 2021/0402600 A1    Dec. 30, 2021

(51) Int. Cl.
*G05D 1/02*   (2020.01)
*B25J 9/16*   (2006.01)
*H04B 17/318* (2015.01)
*H04W 4/80*   (2018.01)
*B25J 13/00*  (2006.01)
*B25J 13/08*  (2006.01)

(52) U.S. Cl.
CPC .......... *B25J 9/1666* (2013.01); *B25J 13/006* (2013.01); *B25J 13/089* (2013.01); *H04B 17/318* (2015.01); *H04W 4/80* (2018.02)

(58) Field of Classification Search
CPC ...... B25J 9/1666; B25J 13/006; B25J 13/089; B25J 11/008; B25J 9/08; B25J 9/1664; B25J 9/1669; B25J 9/1684; B25J 9/1692; H04B 17/318; H04B 17/3913; H04W 4/80; H04W 4/023; G05D 1/0246; G05D 2201/0211; G05D 1/0261; G05D 1/027
See application file for complete search history.

(56) References Cited

U.S. PATENT DOCUMENTS

| 7,363,125 B2 | 4/2008 | Hashimoto et al. |
| 2016/0059875 A1 | 3/2016 | Segman et al. |
| 2017/0003682 A1 | 1/2017 | Segman et al. |
| 2017/0220040 A1* | 8/2017 | London .................. B60Q 5/00 |

(Continued)

FOREIGN PATENT DOCUMENTS

| JP | 3213904 B2 | 10/2001 |
| KR | 10-2013-0014105 A | 2/2013 |
| KR | 10-2017-0115188 A | 10/2017 |

*Primary Examiner* — Jason Holloway
(74) *Attorney, Agent, or Firm* — Birch, Stewart, Kolasch & Birch, LLP

(57) ABSTRACT

A method of tracking a user position using a crowd robot, a tag device, and a robot implementing the same are disclosed, and the robot includes a controller, which cumulatively stores position information of a tag device, generates a moving route corresponding to the stored position information of the tag device, and corrects the position information of the tag device based on position estimation information of a crowd robot around the tag device sent from the tag device.

20 Claims, 15 Drawing Sheets

(56) References Cited

U.S. PATENT DOCUMENTS

2017/0242427 A9* 8/2017 High .................. G06Q 30/0635
2018/0360177 A1* 12/2018 Kovtun ................ G05D 1/0255
2019/0008248 A1* 1/2019 Kovtun ................ G05D 1/0255

* cited by examiner

METHOD OF TRACKING USER POSITION USING CROWD ROBOT, TAG DEVICE, AND ROBOT IMPLEMENTING THEREOF

CROSS REFERENCE TO RELATED APPLICATIONS

This application is the National Stage filing under 35 U.S.C. § 371 of International Application No. PCT/KR2019/008084, filed on Jul. 2, 2019, the contents of which are all hereby incorporated by reference herein in their entirety.

TECHNICAL FIELD

The present disclosure relates to a method of tracking a user position using a crowd robot, a tag device, and a robot implementing the same.

BACKGROUND ART

In spaces where exchanges take place, such as supermarkets, department stores, airports, and golf courses, various people carry various objects. In this case, a device such as a cart may assist a user in movement of an object while moving following the user in order to provide user convenience.

In addition, a device adapted to provide certain information may provide information to a user while following the user in a large space.

In order to allow these robots to assist a user or to provide information, it is necessary for these robots to move following the user. To this end, the robots are required to ascertain a user position.

However, since there can be a problem of distortion of signals or measurement failure in the course of tracking a user position, there is a need for a technique for improving accuracy in tracking the user position by a robot.

DISCLOSURE

Technical Problem

Embodiments of the present disclosure provide a mechanism by which a robot, such as a cart robot or a delivery robot, autonomously moves following a user while tracking a user position.

Embodiments of the present disclosure provide a technique by which a robot tracks a user position based on information generated by other robots upon occurrence of a hindrance in direct tracking of the user position.

Embodiments of the present disclosure provide a technique by which a robot is moved within a predetermined range corresponding to movement of a tag device carried by a user such that the robot can be intuitively ascertained.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solution

In accordance with one embodiment of the present disclosure, a robot tracking a user position using a crowd robot includes a controller, which cumulatively stores position information of a tag device, generates a moving route corresponding to the stored position information of the tag device, and corrects the position information of the tag device based on position estimation information of a crowd robot around the tag device sent from the tag device.

The robot may include a positioning sensor or a Bluetooth module receiving the position estimation information, wherein the position estimation information includes at least one selected from the group of movement information of the tag device, position information of the crowd robot, and intensity information of a signal sent based on a second protocol from the crowd robot.

In the robot, the controller may track movement information of the tag device to control movement of the robot.

In the robot, the controller may calculate a position of the tag device using at least one selected from the group of the position information of the crowd robots and the intensity information.

In accordance with another embodiment of the present disclosure, a tag device includes: a positioning sensor sending a signal based on a first protocol to a first robot; a Bluetooth module receiving a signal based on a second protocol from a second robot and sending a signal based on the second protocol to the first robot; and a tag controller controlling the positioning sensor or the Bluetooth module such that position information sent from the second robot to the Bluetooth module or intensity information of the signal sent based on the second protocol from the second robot is sent to the first robot.

In accordance with a further embodiment of the present disclosure, a method of tracking a user position using a crowd robot includes: measuring a position of a tag device, by a positioning sensor, in response to a signal sent based on a first protocol from the tag device; receiving, by a Bluetooth module, a signal sent based on a second protocol from the tag device; cumulatively storing, by a controller, position information of the tag device, followed by generating a moving route corresponding to the position information of the tag device; correcting, by the controller, the position information of the tag device based on position estimation information of a crowd robot around the tag device sent from the tag device; and moving, by a moving unit, a robot along the moving route.

Advantageous Effects

According to embodiments of the present disclosure, a robot, such as a cart robot or a delivery robot, can autonomously move following a user while tracking a user position.

According to embodiments of the present disclosure, a robot can track a user position based on information generated by other robots through removal of an error in the course of tracking the user position, thereby improving tracking accuracy.

According to embodiments of the present disclosure, a user can intuitively ascertain a robot through selective association of movement of the robot with movement of the tag device.

Effects of the present disclosure are not limited to the above-described ones, and one having ordinary skill in the art to which the disclosure pertains may easily draw various effects from the configuration of the disclosure.

DETAILED DESCRIPTIONS

Figure 1:
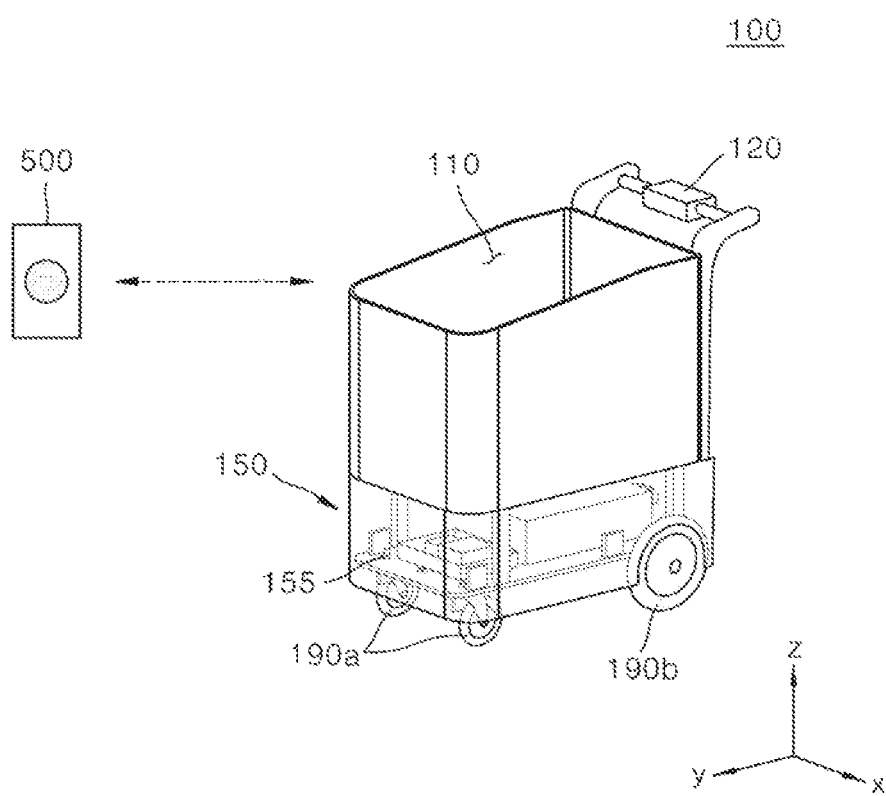
FIG. 1 and FIG. 2 are views illustrating an external appearance of a robot according to one embodiment of the present disclosure.

Hereinafter, embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the specification. Further, some embodiments of the present disclosure will be described in detail with reference to the drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components is not limited by that term. When a component is described as being "connected," "coupled" or "connected" to another component, the component may be directly connected or able to be connected to the other component; however, it is also to be understood that an additional component may be "interposed" between the two components, or the two components may be "connected," "coupled" or "connected" through an additional component.

Further, with respect to embodiments of the present disclosure, for convenience of explanation, the present disclosure may be described by subdividing an individual component, but the components of the present disclosure may be implemented within a device or a module, or a component of the present disclosure may be implemented by being divided into a plurality of devices or modules.

Hereinafter, devices adapted to autonomously move following a user or to move based on electric energy under user control will be variously referred to as smart cart robots, cart robots or, briefly, carts, delivery robots, or the like. Herein, all of these devices will be commonly referred to as robots and these robots are operated in a mode of following a user while tracking a user position.

Such robots can be used in stores, such as large supermarkets and department stores. In addition, users can use the robots in places where travelers gather, such as airports and harbors. Further, the robots can also be used in leisure spaces, such as golf courses.

Further, the robot may provide a predetermined storage space while tracking a user position to follow a user. The robot may move using electric power under control of the user pushing or pulling the robot. As a result, the user can move the robot without manipulating the robot at all. The user can also move the robot with very little force.

Figure 2:
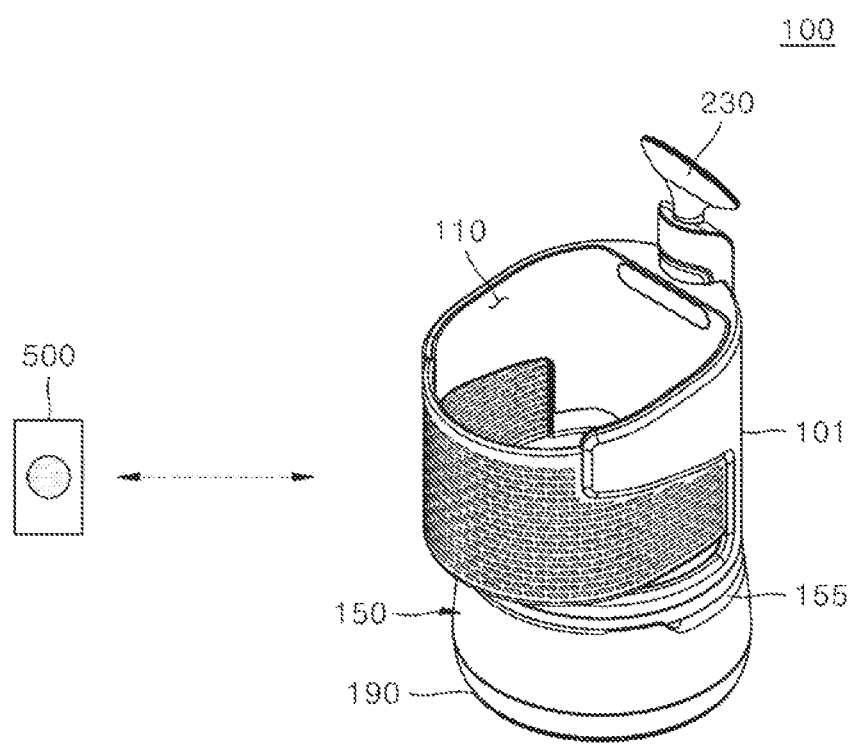

FIG. 1 and FIG. 2 are views illustrating an external appearance of a robot according to one embodiment of the present disclosure. FIG. 1 shows an embodiment of a robot in which a handle assembly 120 and a moving unit 190a, 190b are disposed to be externally discernible. FIG. 2 shows an embodiment of a robot in which a moving unit 190 is disposed inside a cover at a lower side of the cover so as not to be easily externally discernible. The robot 100 shown in FIG. 2 includes a force sensor disposed on an outer case 101 of the robot to sense pressure instead of a separate handle assembly 120 and may be moved by force applied thereto from a user pushing the robot 100.

In FIG. 1 and FIG. 2, the robot 100 includes an accommodation unit 110 and a control module 150. Both robots according to these two embodiments may determine a position of a tag device 500 through communication with the tag device 500.

The robot shown in FIG. 1 includes the handle assembly 120 and the moving unit 190a, 190b. The accommodation unit 110 defines a space in which an object is received or loaded by a user. The handle assembly 120 is adapted to allow a user to manually or semi-automatically control movement of the cart robot 100.

Referring to FIG. 1, a user can push the robot in a front or rear direction or can change a movement direction of the robot using the handle assembly 120. In this case, the robot 100 may be semi-automatically driven using electric energy depending upon the magnitude of force applied to the handle assembly 120 or difference in force between left and right sides in application of the force.

The control module 150 disposed inside the robot controls movement of the robot 100. In particular, the control module 150 controls autonomous driving of the robot so as to allow the robot to follow a user. In addition, the control module 150 controls semi-autonomous driving (power assist) of the robot by supplementing force of the user upon pushing or pulling the robot with low force.

The control module 150 may control the moving unit 190. The moving unit 190 moves the robot along a moving route generated by a controller 250. The moving unit 190 may move the robot by rotating wheels constituting the moving unit 190.

When the robot is moved by the moving unit 190, rotation information of the wheels, such as the rotational speed, the number of rotation times, and the rotation direction of the wheels, is calculated. The controller 250 may ascertain the position of the robot 100 based on the calculated information during movement. The moving route generated by the controller 250 includes angular speeds of a left wheel and a right wheel of the robot.

In addition, the robot 100 may be provided at several regions thereof with positioning sensors adapted to track a user position in order to follow the user. Further, the robot 100 may be provided at several regions thereof with obstacle sensors adapted to sense obstacles around the robot. The positioning sensors may detect the tag device 500 that outputs a particular signal.

The robot according to embodiments of the present disclosure may have a different shape from the robot shown in FIG. 1 or FIG. 2 and the present disclosure is not limited to the shapes of the robots shown in FIG. 1 and FIG. 2.

Figure 3:
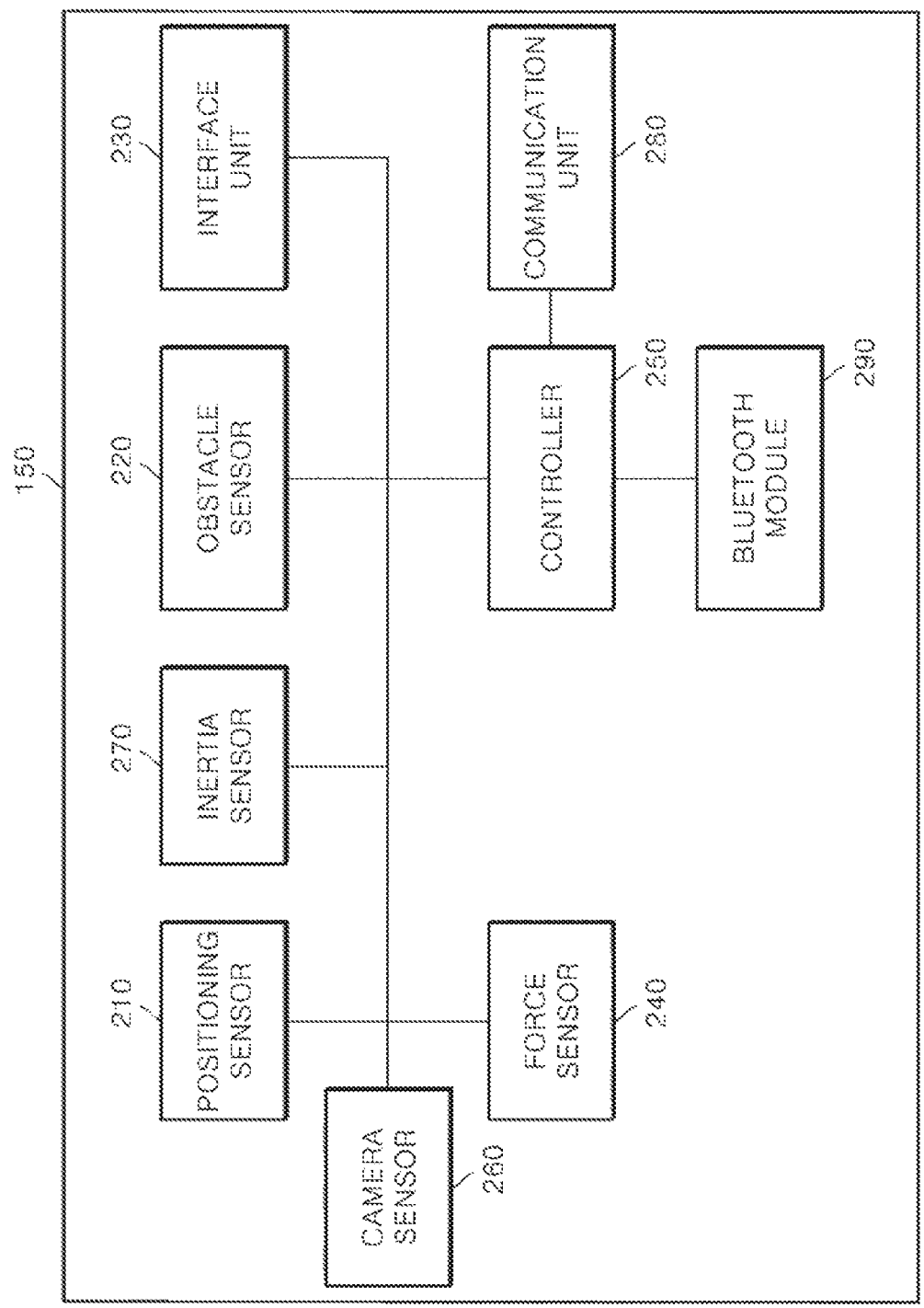
FIG. 3 is a block diagram illustrating configuration of a control module according to one embodiment of the present disclosure.

FIG. 3 will be referred to hereinafter. FIG. 3 is a block diagram of a robot according to one embodiment of the present invention, which may be a cart robot or a delivery robot. As main elements, the robot according to this embodiment includes: a positioning sensor 210 measuring a position of a tag device in response to a signal received from the tag device based on a first protocol; a Bluetooth module 290 receiving a signal received from the tag device 500 based on a second protocol; an obstacle sensor 220 sensing an obstacle around the robot; a controller 250 cumulatively storing position information of the tag device 500, generating a moving route corresponding to the stored position information of the tag device, and correcting the position information of the tag device 500 based on position estimation information of crowd robots around the tag device 500 sent from the tag device 500; and a moving unit 190 moving along the moving route.

In FIG. 3, the positioning sensor 210, a force sensor 240, the obstacle sensor 220, an interface unit 230, the controller 250, a camera sensor 260, and a communication unit 280 are logical elements constituting the control module 150 of the robot 100 shown in FIG. 1 or FIG. 2. In the robot shown in FIG. 2, the force sensor 240 is selectively disposed.

The obstacle sensor 220 senses an obstacle around the robot. The obstacle sensor 220 can sense a distance between the robot and a person, a wall, an object, a fixed object, an installed object, or the like.

The positioning sensor 210 is an essential element of the robot that supports autonomous traveling. However, in a robot that supports only semi-autonomous (power assist) traveling, the positioning sensor 210 may be selectively disposed.

The positioning sensor 210 tracks a position of a user who carries the tag device 500 and is disposed on an upper side, a lateral side, or the like of the robot 100. However, the positions of these sensors can be changed and the invention is not limited thereto. Regardless of the positions of the sensors, the control module 150 controls the sensors or uses information sensed by the sensors. That is, the sensors are logical elements of the control module 150 regardless of the physical positions thereof.

The positioning sensor 210 includes an anchor. The positioning sensor 210 receives a signal from the tag device 500 and calculates the position of the tag device 500. When the positioning sensor 210 uses ultra-wideband (UWB), a user may carry the tag device 500 adapted to send predetermined signals to the positioning sensor 210. In addition, the positioning sensor 210 may ascertain a user position based on the position of the tag device 500.

According to one embodiment, a user may carry the tag device 500 implemented in a band shape to be attached to the wrist. The robot may include at least one positioning sensor 210. In an embodiment wherein two positioning sensors 210 are provided to the robot, the robot may calculate two candidate positions of the tag device 500. In this embodiment, the robot may ascertain the position of the tag device 500 by selecting a position near a previous position of the tag device 500 among the two candidate positions.

In an embodiment wherein three positioning sensors 210 are provided to the robot, the robot may calculate the position of the tag device 500.

In addition, the interface unit 230 may be provided to the handle assembly 120 of FIG. 1 or an upper portion of the robot 100 of FIG. 2 to output information to a user. The interface unit 230 may also be an element under control of the control module 150. In addition, the handle assembly 120 includes the force sensor 240 that senses force of a user pushing or pulling the robot. Obviously, the robot of FIG. 2 may also be provided at an outer case thereof with the force sensor 240 to detect the force of the user pushing or pulling the robot.

The force sensor 240 may be disposed in a region of the handle assembly 120 shown in FIG. 1, in which variation of force occurs through manipulation of the handle assembly, or in a region of the outer case 101 shown in FIG. 2, in which force applied to the outer case 101 can be sensed. The force sensor 240 may be disposed inside or outside the robot 100. The position or configuration of the force sensor 240 may be implemented in various ways and embodiments of the present disclosure are not limited to a particular force sensor 240.

In the embodiment of FIG. 1, the force sensor 240 may be disposed on the handle assembly 120 or may be disposed inside or outside the robot 100 connected to the handle assembly 120. In the embodiment of FIG. 2, the force sensor 240 is disposed inside the outer case 101.

The force sensor 240 senses the magnitude or variation of force applied to the handle assembly 120 or the outer case 101 by a user. The force sensor 240 may include various sensors, such as a Hall sensor, a magnetic type sensor, a button type sensor, and the like. The force sensor 240 may include a left force sensor and a right force sensor disposed on the handle assembly 120, inside or outside the robot 100, or on the outer case 101.

The obstacle sensor 220 senses an obstacle around the robot. The obstacle sensor includes a sensor that measures a distance or acquires an image and ascertains an obstacle in the image. An exemplary embodiment of the obstacle sensor 220 that measures a distance includes an infrared sensor, an ultrasonic sensor, and a LIDAR sensor.

The obstacle sensor 220 includes a depth sensor or an RGB sensor. The RGB sensor can sense an obstacle and an installed object in an image. The depth sensor can calculates depth information for each position in an image.

The obstacle sensor 220 includes a time-of-flight (TOF) sensor.

The controller 250 cumulatively stores position information of a tag device and generates a moving route corresponding to the stored position information of the tag device.

In order to cumulatively store the position information, the controller 250 can store the position information as absolute position information (absolute coordinates) based on a predetermined reference point.

Alternatively, the controller 250 may control movement of the robot using the obstacle sensor 220 and the camera sensor 260. The controller 250 controls the movement direction or speed of the moving unit depending upon the magnitude or variation of force sensed by the force sensor 240. Alternatively, the controller 250 may control the moving unit 190 so as to supply more electric energy to a motor of the moving unit in order to control the movement speed.

The controller 250 detects an installed object around the robot using a value sensed by the obstacle sensor 220. The controller 250 can ascertain an installed object using the obstacle sensor 220 disposed on a lateral side and a front side of the robot.

The camera sensor 260 may photograph images of objects/persons/installed objects around the robot. The camera sensor 260 may be provided to a lower side, a lateral side, a front side, and the like of the robot 100.

The obstacle sensor 220 or the camera sensor 260 may be provided to various positions of the robot 100, such as the lower side, the middle or the lateral side thereof, to sense or photograph objects in various directions.

For example, a plurality of obstacle sensors 220 may be disposed in a region indicated by 155 of FIGS. 1 and 2 to sense obstacles in front/left/right/rear sides of the robot. The obstacle sensors 220 may be disposed at the same height on the lower side of the robot 100. Alternatively, the obstacle sensors 220 may be disposed in at least two regions having different heights on the lower side of the robot 100. Alternatively, the obstacle sensors may be disposed on the robot 100 in a moving direction thereof, such as the front side and the opposite lateral sides of the robot 100. When the robot 100 moves backwards, the obstacle sensors may be disposed on the front and rear sides and the opposite lateral sides of the robot.

Likewise, the camera sensor 260 may also be provided to various positions of the robot 100, where the obstacle sensor 220 are disposed, to acquire images of objects. For example, when the camera sensor 260 is provided to acquire image information in front of the robot, the camera sensor 260 may be disposed at the front side of the robot 100. Alternatively, when the camera sensor 260 is provided to acquire image information below the robot, the camera sensor may be disposed under the robot 100.

The Bluetooth module 290 constitutes the communication unit 280 and may send and receive signals based on the Bluetooth protocol. The Bluetooth module 290 provides a function of improving accuracy of the positioning sensor 210 in tracking a user position. That is, tracking of the user position is realized through a UWB RTLS (real-time location system) by the plurality of positioning sensors 210 attached to the robot On the other hand, signal interruption or quality deterioration (a position bounding phenomenon) can occur between the tag device 500 and the positioning sensor 210. In this case, the Bluetooth module 290 may generate autonomous position information between another tag device carried by another user and plural robots interacting with the other tag device. Furthermore, the Bluetooth module 290 may be used to confirmatively track the position of the tag device 500 carried by the user based on BLE RSSI (Received Signal Strength Indicator) information.

The above robot 100 may calculate odometry information based on operation or a previous moving route of the moving unit 190. Alternatively, the robot 100 may calculate position information of the robot in the course of SLAM (simultaneous localization and mapping).

Further, the controller 250 may calculate an orientation and distance of the tag device 500 using packets received between the positioning sensor 210 and the tag device 500. Obviously, the controller 250 or the control module 150 may be provided therein with a separate micro-controller for the positioning sensors 210.

In addition, the control module 150 may optionally further include an inertia sensor (inertia measurement unit, or inertia measurement sensor) 270. The inertial sensor includes a gyro sensor or an acceleration sensor to sense inertia generated during movement of the robot.

The controller 250 of the robot may perform context awareness using an artificial intelligence module. Likewise, the controller 250 may recognize circumstances of the robot 100 using sensed values, user control, or information received from other cart robots or serves as input values of the artificial intelligence module. In particular, the artificial intelligence module of the controller 250 may provide a determination function under recognition of the circumstances of the robot 100 whether the robot 100 tracks a user position using received position information of crowd robots or autonomously tracks the position of the tag module carried by a user.

Further, the controller 250 of the cart robot may read input information using an artificial intelligence module.

The aforementioned artificial intelligence module may include an inference engine, a neural network, and a probability model. In addition, the artificial intelligence module may perform supervised learning or unsupervised learning based on various data.

Further, the artificial intelligence module may perform natural language processing in order to extract information through recognition of user voice.

Further, the controller 250 of the cart robot 100 provides a voice recognition function and a text-to-speech (TTS) function.

Figure 4:
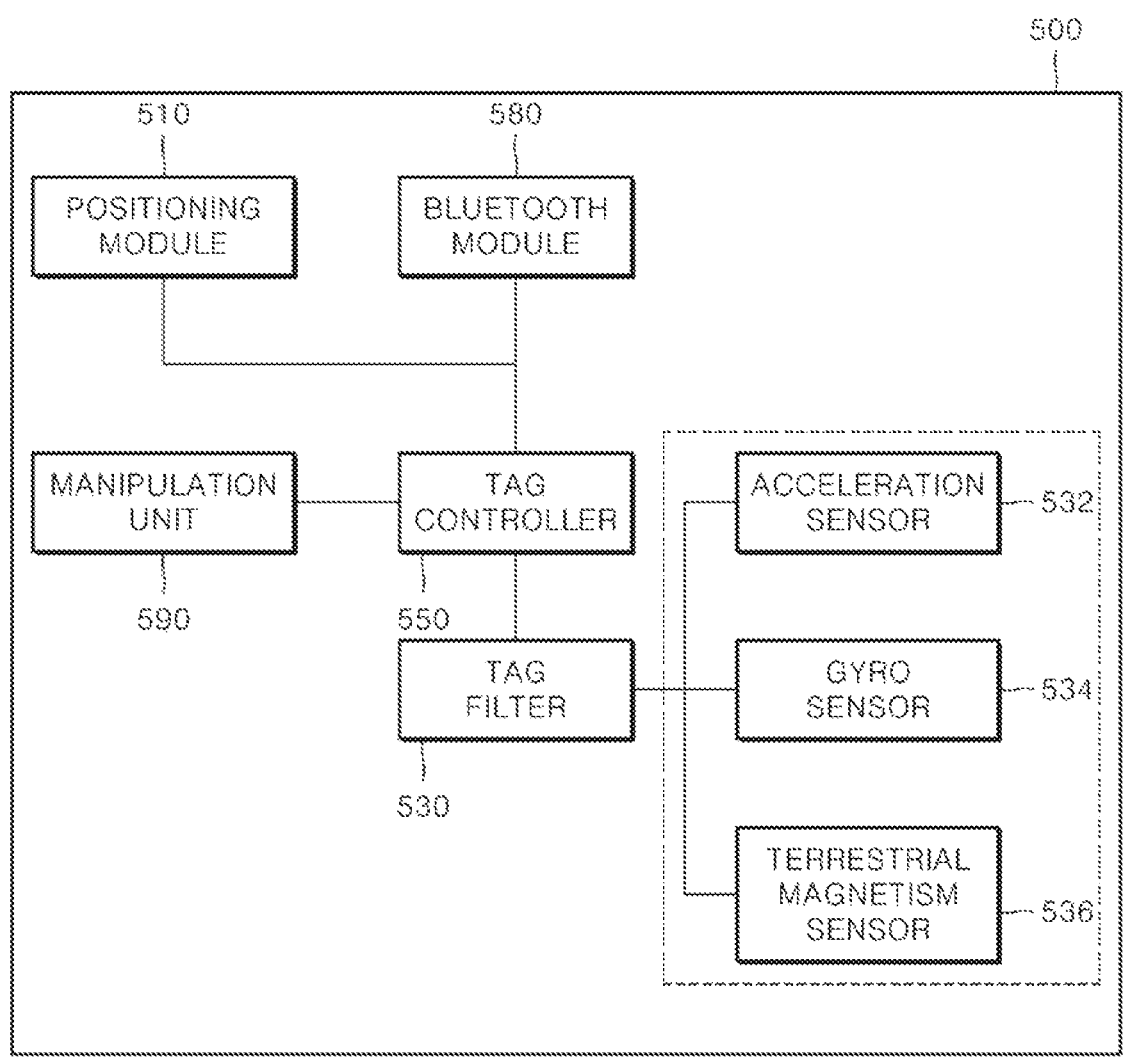
FIG. 4 is a block diagram illustrating configuration of a tag device according to one embodiment of the present disclosure.

FIG. 4 is a block diagram illustrating configuration of a tag device according to one embodiment of the present disclosure. In one embodiment, the tag device 500 may be a tag worn or carried by a user.

As main elements, the tag device 500 includes a positioning sensor 510 sending a signal based on a first protocol (UWB in one embodiment) to a first robot (follower robot), a Bluetooth module 580 receiving a signal based on a second protocol (Bluetooth in one embodiment) from a second robot (crowd robot) and sending a signal based on the second protocol to the first robot, and a tag controller 550 controlling the positioning sensor 510 or the Bluetooth module 580 such that position information sent from the second robot to the Bluetooth module or intensity information of the signal sent based on the second protocol from the second robot is sent to the first robot In addition, the tag device 500 may further include movement detection sensors 532, 534, 536 sensing movement of the tag device, and a tag filter 530 filtering values sensed by the movement detection sensors. In this case, a tag controller 550 controls the positioning sensor 510 or the Bluetooth module 580 to send movement information of the tag device 500 calculated by the tag filter 530 to the first robot. This configuration will now be described in more detail.

The positioning sensor 510 sends or receives packets to or from the positioning sensor 210 of the robot. For example, in an embodiment wherein the positioning sensor 210 of the robot is a UWB module and the positioning sensor 510 is also a UWB module, the positioning sensor 510 sends or receives UWB packets to or from the robot. Then, the positioning sensor 210 may receive the UWB packets and the controller 250 of the robot may calculate the orientation and distance of the tag device 500 based on the received packets.

The Bluetooth module 580 receives position information of the robot, for example, localization data, from the Bluetooth module 290 of the robot. The position information may include odometry information calculated by the robot 100 based on operation or a previous moving route of the moving unit 190.

Alternatively, the position information may include position information of the robot calculated in the course of SLAM (simultaneous localization and mapping) of the robot. In addition, the Bluetooth module 580 of the tag device 500 may collect RSSI, which is characteristics of signals in Bluetooth communication with robots, through Bluetooth communication with the Bluetooth module 290 of the robot.

The tag device 500 includes an acceleration sensor 532, a gyro sensor 534, and a terrestrial magnetism sensor 536, which sense physical variation of the tag device 500, and a tag filter 530 adapted to filter the posture or movement of a user carrying the tag device 500 using values sensed by these sensors. Herein, the acceleration sensor 532, the gyro sensor 534, and the terrestrial magnetism sensor 536 are collectively referred to as movement detection sensors.

The tag controller 550 controls elements of the tag device 500. The acceleration sensor 532 and the gyro sensor 534 may be integrated with each other to constitute one IMU (Inertia Measurement Unit, inertia sensor or inertia measurement sensor) sensor.

A manipulation unit 590 may allow the robot to be operated in a mode in which a user manipulates the robot using the tag device 500. In one embodiment, the manipulation unit 590 may be implemented in a button type. In another embodiment, the manipulation unit 590 may be implemented to receive touch input. That is, the manipulation unit 590 receives a manipulation signal from a user.

When the manipulation unit 590 is manipulated by a user, for example, when the button is pushed or touched by the user, the tag controller 550 informs the robot following the tag device 500 that a manipulation mode is activated. Then, the robot is moved or operated corresponding to movement of the tag device 500. The tag controller 550 controls transmission of the movement information of the tag device 500 in response to manipulation of the manipulation unit 590.

Figure 5:
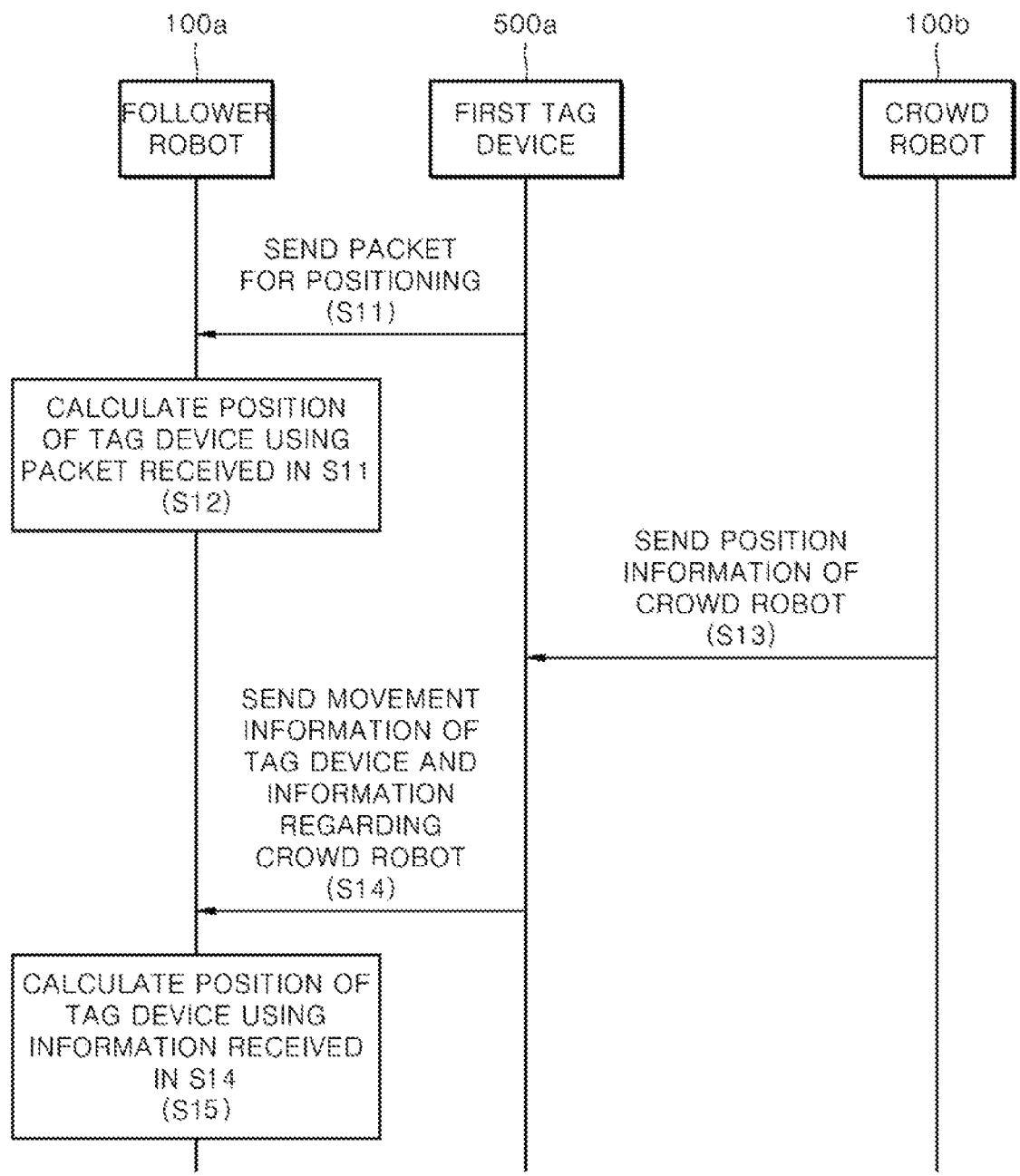
FIG. 5 is a diagram illustrating a process of sending and receiving information among a tag device, a follower robot and a crowd robot according to one embodiment of the present disclosure.

FIG. 5 is a diagram illustrating a process of sending and receiving information among a tag device, a follower robot and a crowd robot according to one embodiment of the present disclosure.

A follower robot 100a is a robot adapted to follow a first tag device 500a while ascertaining a position of the first tag device 500a. A crowd robot 100b sends position information of the robot in a state of being paired with the first tag device 500a. Typically, one follower robot 100a is allocated to the first tag device 500a. Alternatively, a plurality of follower robots may follow one first tag device 500a.

In addition, the crowd robot 100b may follow a second tag device instead of the first tag device 500a. Although the crowd robot 100b does not follow the first tag device 500a, the crowd robot 100b sends the position information to the first tag device 500a. Alternatively, the crowd robot 100b may not follow any tag device.

Accordingly, the follower robot and the crowd robot may be classified with reference to the tag device and a robot following any one tag device may act as a crowd robot with respect to another tag device.

Referring to FIG. 5, the first tag device 500a sends packets for positioning to the follower robot 100a (S11). Then, the follower robot 100a calculates the position of the first tag device 500a using the received packets (S12).

On the other hand, in order to improve accuracy in estimation of the position of the first tag device 500a by the follower robot 100a, the crowd robot 100b not acting as the follower robot 100a and placed a predetermined distance or less from the first tag device 500a sends position information of the crowd robot (S13). In S13, the first tag device 500a receives the position information of each crowd robot 100b from one or more crowd robots 100b.

In particular, transmission of information in S13 may be carried out through Bluetooth communication. In this case, a first transmission robot 500a may ascertain BLE RSSI during Bluetooth communication with the crowd robot 100b.

Accordingly, the first tag device 500a sends the movement information of the tag device and the distance information with respect to each of the crowd robots 100b to the follower robot 100a (S14).

Then, the follower robot 100a calculates the position of the tag device using the received information (S15). In S12, the position of the tag device may be calculated using the packets for positioning sent from the first tag device 500a based on, for example, UWB communication. However, if there is an obstacle between the first tag device 500a and the follower robot 100a in S12, the follower robot 100a can calculate an incorrect position.

Accordingly, the follower robot 100a may receive position information of other robots as in S15 to improve accuracy in calculation of the position of the first tag device 500a by reflecting the position information of the other robots.

In summary of FIG. 5, the positioning sensor 210 or the Bluetooth module 290 of the robot 100, particularly the follower robot 100a, receives the position estimation information. Here, the position estimation information includes at least one selected from the group of the movement information of the tag device 500a, the position information of the crowd robot 100b, and intensity information of a signal sent based on the Bluetooth protocol from the crowd robot 100b.

Figure 6:
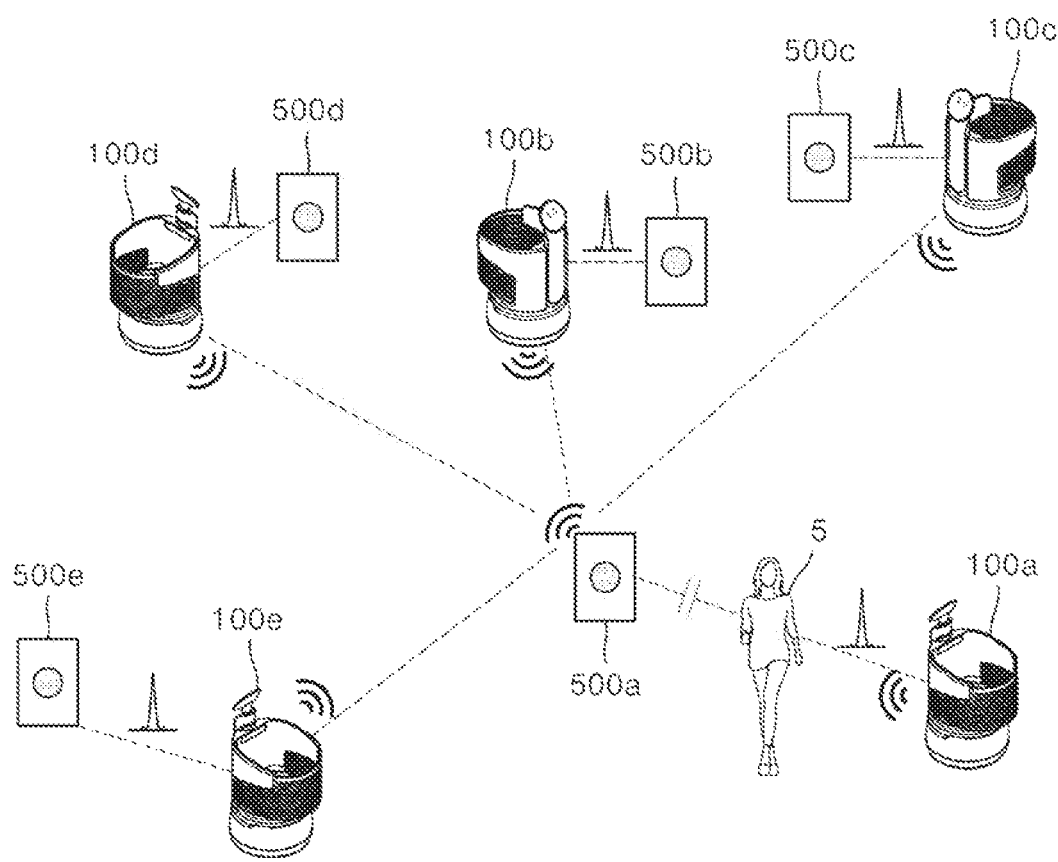
FIG. 6 is a view illustrating configuration of follower robots and crowd robots according to embodiments of the present disclosure.

FIG. 6 is a view illustrating configuration of follower robots and crowd robots according to embodiments of the present disclosure. A follower robot of a first tag device 500a is a first robot 100a. A follower robot of a second tag device 500b is a second robot 100b. A follower robot of a third tag device 500c is a third robot 100c. A follower robot of a fourth tag device 500d is a fourth robot 100d. A follower robot of a fifth tag device 500e is a fifth robot 100e.

With reference to the first tag device 500a, the crowd robots are denoted by 100b to 100e. With reference to the second tag device 500b, the crowd robots are denoted by 100a, 100c to 100e. With reference to the third tag device 500c, the crowd robots are denoted by 100a, 100b, 100d and 100e. With reference to the fourth tag device 500d, the crowd robots are denoted by 100a to 100c, and 100e. With reference to the fifth tag device 500d, the crowd robots are denoted by 100a to 100d.

In the configuration of FIG. 6, the first tag device 500a communicates with the first robot 100a based on UWB communication, in which the first robot 100a receives UWB packets from the first tag device 500*a* to calculate the position of the first tag device 500*a*.

On the other hand, an obstacle 5 can be placed between the first tag device 500*a* and the first robot 100*a* in this process. However, the first tag device 500*a* receives the position information of the crowd robots from the plural crowd robots 100*b* to 100*e* based on Bluetooth communication.

In addition, the first tag device 500*a* can calculate the distances between the crowd robots 100*b* to 100*e* and the first tag device 500*a* using the RSSI of the Bluetooth communication packets sent from the crowd robots 100*b* to 100*e* to the first tag device 500*a*. Additionally, the first tag device 500*a* can move and can calculate movement information thereof.

Further, the first tag device 500*a* sends the movement information and the information of the crowd robots 100*b* to 100*e* to the first robot 100*a*, which is a follower robot. In this case, according to one embodiment, transmission is carried out based on UWB communication or Bluetooth communication.

The first robot 100*a* may calculate the position of the first tag device 500*a* using the received information. Thus, even in the case where the first robot 100*a* fails to receive the UWB packets from the first tag device 500*a* or distortion of signals occurs due to the obstacle, the first robot 100*a* can calculate the position of the first tag device 500*a* based on the movement information sent from the first tag device 500*a* and the information of the crowd robots 100*b* to 100*e*.

Referring to FIG. 6, the tag device 500*a* may select the crowd robots 100*b* to 100*e*, which will perform Bluetooth communication. For example, the tag device 500*a* may preferentially select robots closest thereto as the crowd robots. This selection may be performed using the intensity (RSSI) of Bluetooth signals. Alternatively, the tag device 500*a* may select robots gathered adjacent one another or distributed at various angles using position information sent from each of the robots.

Figure 7:
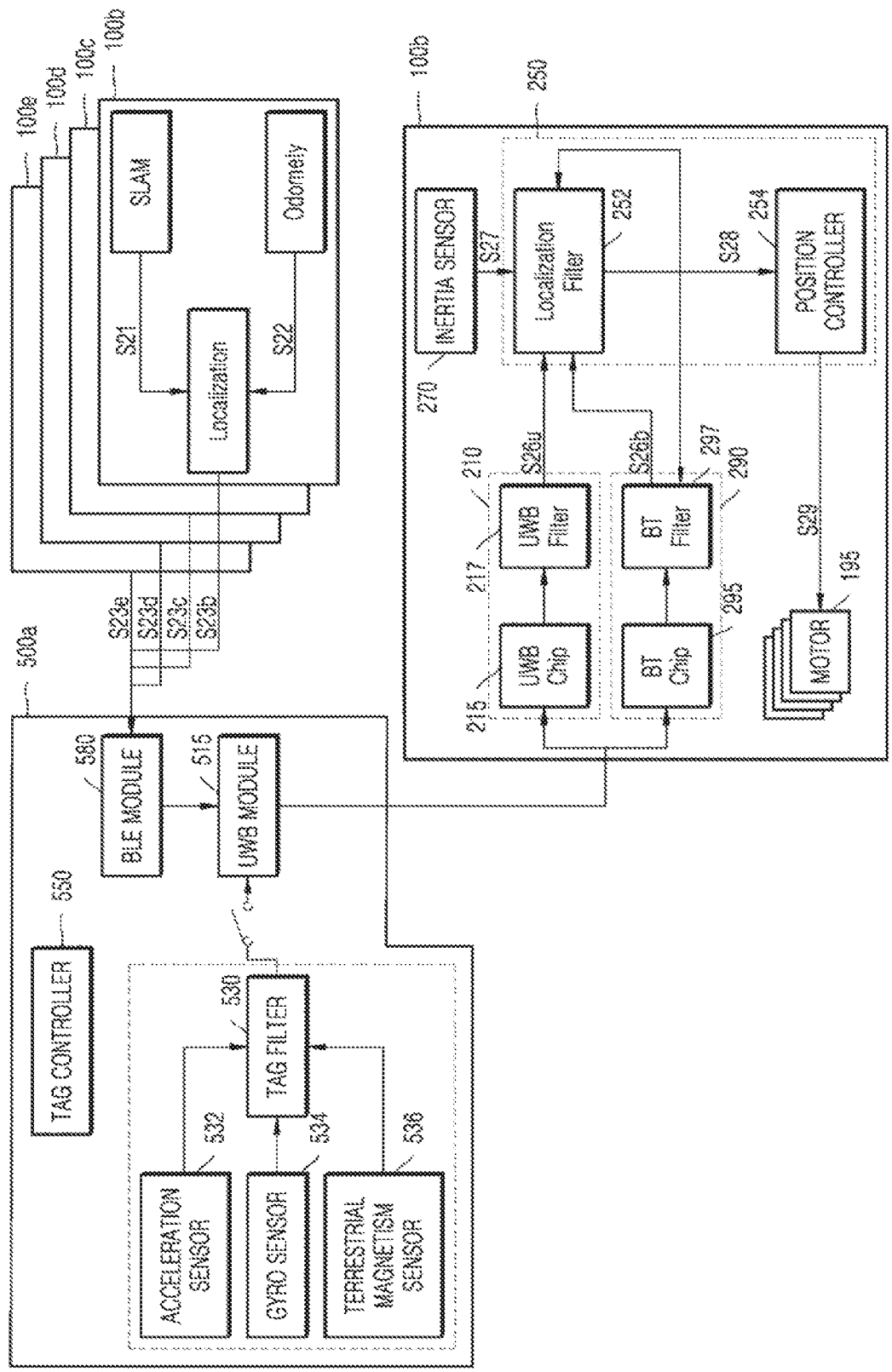
FIG. 7 is a block diagram illustrating details of a process shown in FIG. 6.

FIG. 7 is a block diagram illustrating details of a process shown in FIG. 6. FIG. 7 shows interaction among the tag device 500*a*, the crowd robots 100*b* to 100*e* and the follower robot 100*a*. In FIG. 7, a UWB module 515 is provided as one example of the positioning sensor 510 of the tag device 500*a*.

In addition, the positioning sensor 210 of the robot also includes a UWB chip 215 and a UWB filter 217. The Bluetooth module 290 of the robot includes a Bluetooth chip (BT chip) 295 and a Bluetooth filter 297.

The crowd robots 100*b* to 100*e* may calculate SLAM information by performing SLAM during movement. Further, the crowd robots 100*b* to 100*e* may calculate odometry information through the moving unit 190 of the robot. The SLAM information and the odometry information are collected into position information (localization data) by the controller 250 of the robot (S21, S22).

Then, the collected data are sent to the tag device 500*a*. The tag device 500*a* and the plurality of crowd robots 100*b* to 100*e* are paired through Bluetooth communication within a predetermined distance. Accordingly, the crowd robots 100*b* to 100*e* send the position information (localization data) of each robot to the tag device 500*a* paired through Bluetooth communication (S23*b* to S23*e*).

The BLE module 580 of the tag device 500*a* receives the position information (localization data) of the crowd robots (S23*b* to S23*e*). The position information of the crowd robots is sent to the follower robot 100*a* through the UWB module 515. Alternatively, the position information of the crowd robots may be sent to the follower robot 100*a* through the BLE module 580.

On the other hand, the acceleration sensor 532, the gyro sensor 534, and the terrestrial magnetism sensor 536 also estimate variation in movement and posture of the tag device 500*a* and provide posture/movement information to the tag filter 530.

The values sensed by the acceleration sensor 532, the gyro sensor 534, and the terrestrial magnetism sensor 536 are subjected to a process, such as conversion of coordinates, in the tag filter 530 to be used for calculation of the posture and movement of the tag device. The BLE module 580 may calculate not only the position information of the crowd robots, but also intensity information of signals in the course of receiving the position information.

That is, the tag controller 550 collects and sends the movement information of the tag device calculated by the tag filter 530, the position information of other crowd robots sent from the BLE module 580, and the distance information based on the intensity (RSSI) information of signals received by the BLE module 580 to the follower robot 100*a* through the UWB module 515 or the BLE module 580 (S25).

A switch may be disposed between the tag filter 530 and the UWB module 515, and when the tag device 500*a* does not move, the tag controller 550 may send not only the position information of the crowd robots but also the intensity information of the signals in the course of receiving the position information to the follower robot 100*a*.

When received through Bluetooth communication, the received information is input to a localization filter 252 in the controller 250 through the BT chip 295 and the BT filter 297 of the follower robot 100*a* (S26*b*). Here, the BT filter 297 may include a position estimation model. As a result, the BT filter 297 may provide the position information to the localization filter 252.

When received through UWB communication, the received information is input to the localization filter 252 in the controller 250 through the UWB chip 215 and the UWB filter 217 of the follower robot 100*a* (S26*u*). Here, the UWB filter 217 may include a position estimation model. As a result, the UWB filter 217 may provide the position information to the localization filter 252.

In addition, the positioning sensor 210 may calculate the speed or position information of the tag device 500*a* in the course of receiving the UWB packets of the tag device 500*a*, and sends the received information to the localization filter 252.

Further, the inertia sensor 280 adapted to sense whether the robot moves or not in the course of receiving the information also sends the sensed value to the localization filter 252 (S27).

Then, the localization filter 252 of the controller 250 generates the position information and the speed information of the tag device 500*a* and sends the position/speed information to a position controller 254 (S28). The position controller 254 generates control information for moving the position of the robot and provides the generated control information to a motor 195 constituting the moving unit 190 (S29).

Figure 8:
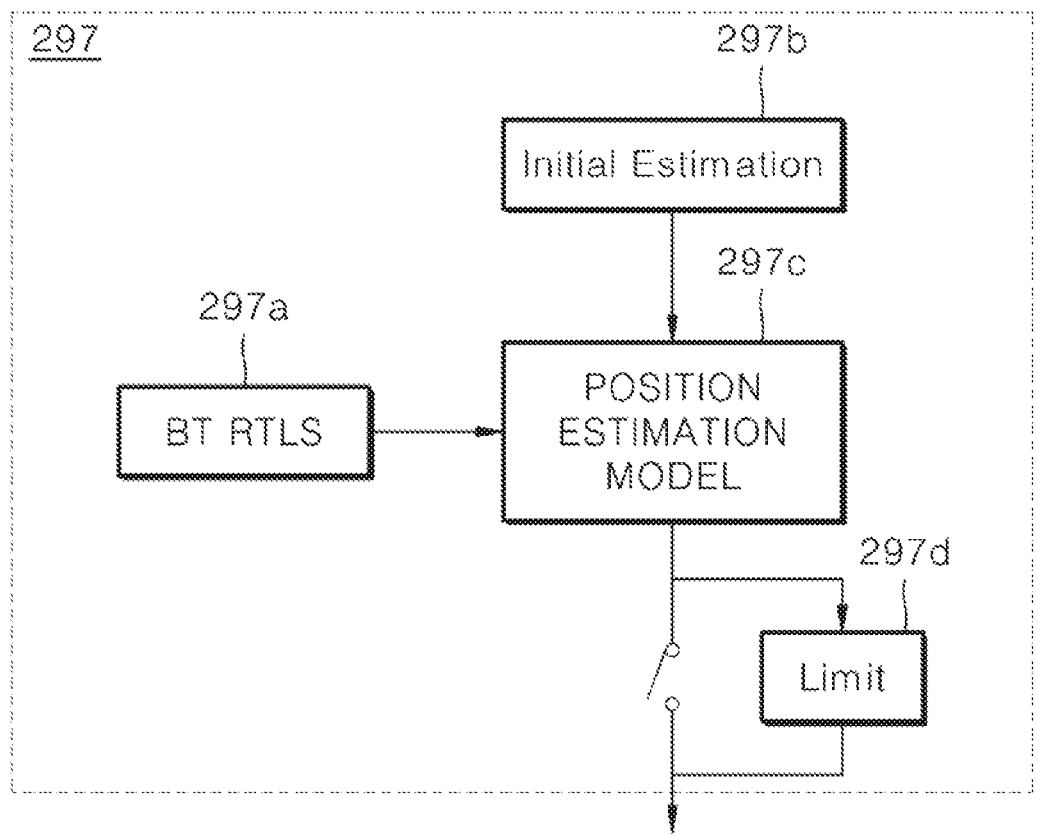
FIG. 8 is a block diagram illustrating details and operation of a Bluetooth filter according to one embodiment of the present disclosure.

FIG. 8 is a block diagram illustrating details and operation of a Bluetooth filter according to one embodiment of the present disclosure.

The BT filter 297 includes a Bluetooth real time location system (BT RTLS) 297*a*. The BT RTLS 297*a* calculates an absolute position of a user with respect to other robots.

An initial estimation unit 297b provides an initial estimation value to a position estimation model 297c. The position estimation model 297c calculates the position of the tag device with respect to the robot based on the position value calculated by the BT RTLS 297a. This calculation process is repeated by the BT filter 297 until an optimum value is estimated.

In addition, Limit 297d becomes a filter for adjusting sensitivity of position estimation (average value or boundary value applied) and use of this filter at the outside may be controlled by switching.

That is, the Bluetooth module 290 adapted to use Bluetooth includes the Bluetooth chip 295, which sends and receives Bluetooth signals, and the Bluetooth filter 297. In addition, the Bluetooth module 290 calculates the position information of the tag device 500a with respect to the crowd robots.

Alternatively, the controller 250 may calculate the position information of the tag device 500a using the position information of the crowd robots and the intensity information of the Bluetooth signals after the Bluetooth module 290 receives the information.

Further, the intensity information (RSSI) of the signal between the Bluetooth module 290 and the tag device 500a may also be used in calculation of the position information of the tag device 500a by the controller 250.

Figure 9:
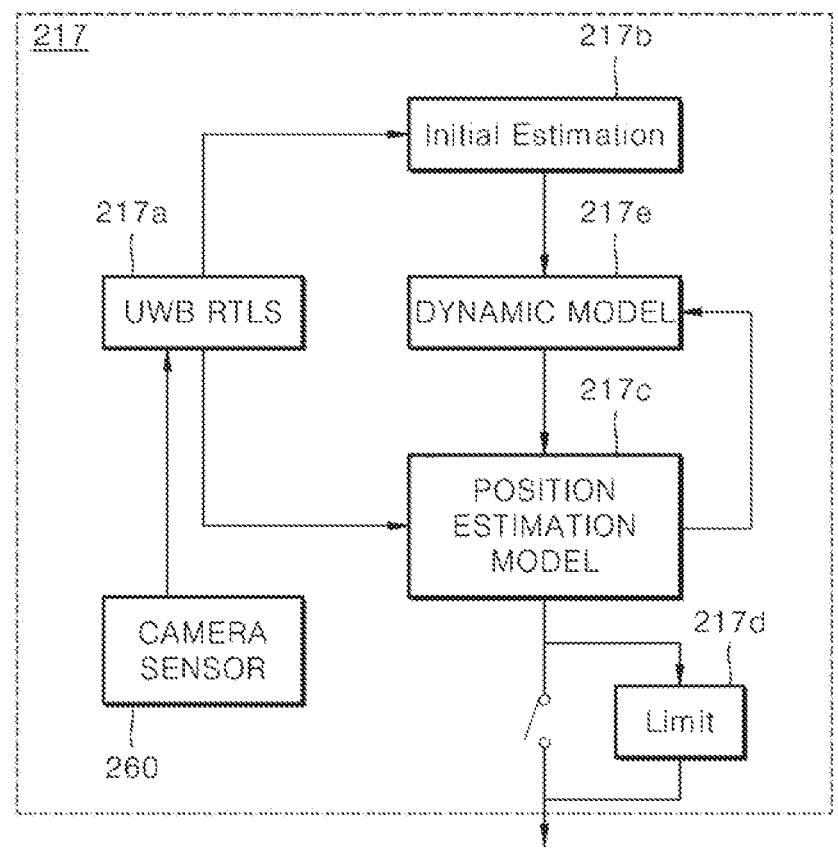
FIG. 9 is a block diagram illustrating details and operation of a UWB filter according to one embodiment of the present disclosure.

FIG. 9 is a block diagram illustrating details and operation of a UWB filter according to one embodiment of the present disclosure. A UWB real time location system (UWB RTLS) 217a calculates a user position with reference to the robot using a UWB localization algorithm. An initial estimation unit 217b provides an initial estimation value to a dynamic model 217e. The dynamic model 217e provides a fundamental kinetic model with respect to movement of the tag device. Here, the posture/movement estimation values sent from the tag device 500 are applied.

A position estimation model 217c updates the dynamic model using the position value calculated by the UWB localization algorithm. Then, calculation of the position is repeated by the UWB filter 217 until an optimal value is estimated. The Limit 297d acts as a filter for adjusting sensitivity of position estimation (average value or boundary value applied) and use of this filter at the outside may be controlled by switching.

The UWB filter 217 may selectively use information photographed by the camera sensor 260. According to one embodiment, the camera sensor 260 may be a stereo camera, a depth camera, and the like. The UWB filter 217 may compensate for a position error upon UWB positioning by reflecting an image photographed by the camera sensor 260.

That is, the positioning sensor 210 adopting the UWB protocol for communication includes a chip 215 adapted to send and receive UWB signals and a UWB filter 217. The robot 100a is provided with at least two, preferably at least three, such positioning sensors. The UWB filter 217 estimates the position of the tag device 500a by reflecting the movement information of the tag device 500a.

Figure 10:
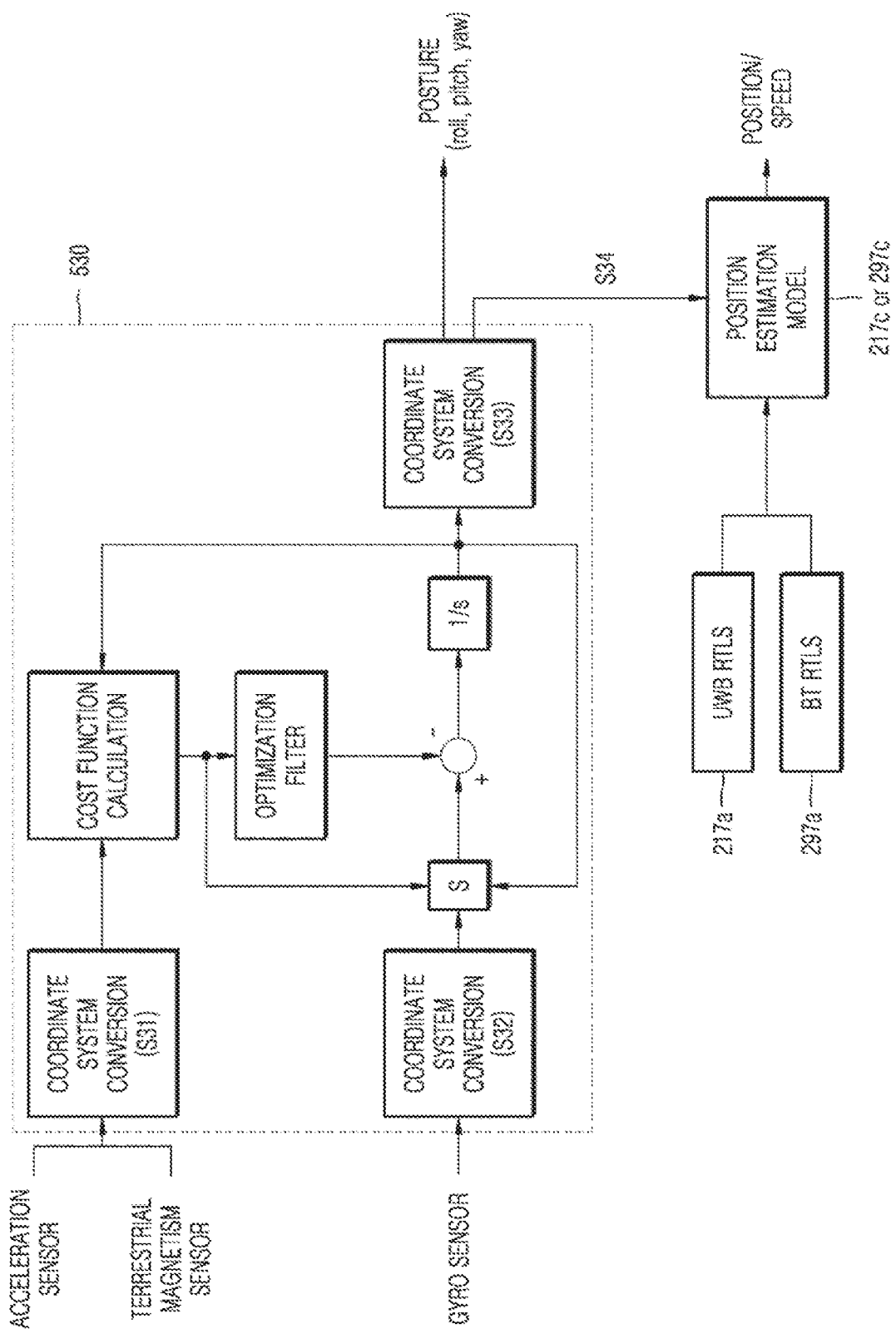
FIG. 10 is a block diagram illustrating operation of a tag filter according to one embodiment of the present disclosure.

FIG. 10 is a block diagram illustrating operation of a tag filter according to one embodiment of the present disclosure.

The tag filter 530 converts the coordinate system of values sensed by the acceleration sensor 532 and the terrestrial magnetism sensor 536 (S31). In addition, the value sensed by the gyro sensor 534 also converts the coordinate system (S32). The coordinates converted in S31 are input to a cost function to calculate a cost function result, which in turn is input to an optimization filter.

On the other hand, the converted values and the cost function calculation result obtained in S32 are collected (s), and these are calculated with respect to values obtained through the optimization filter, and inverted (1/s), thereby performing conversion of the coordinate system (S33). As a result, information about movement of the tag device 500, that is, movement information (roll, pitch and yaw) of the tag device 500 with respect to the x, y and z-axes, is calculated.

On the other hand, acceleration in earth frame is sent to the position estimation model 217c or 297c of the robot 100a (S34). In addition, the position estimation model 217c or 297c may calculate the position and moving speed of the tag device 500a using the information supplied from the UWB RTLS 217a or the BT RTLS 297a.

Figure 11:
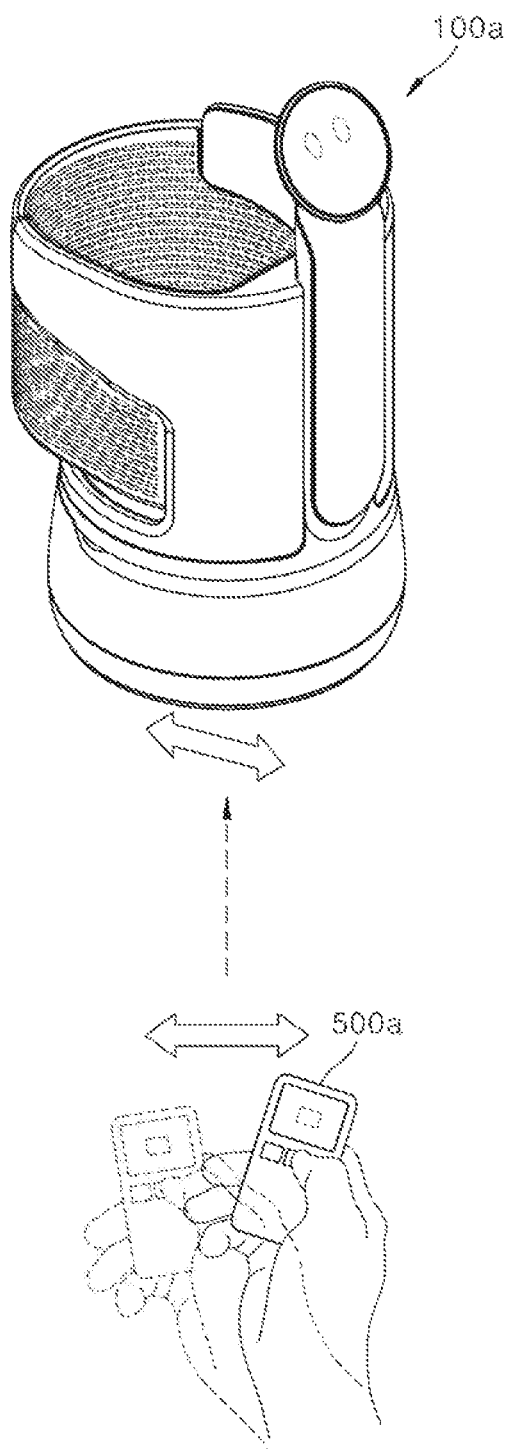
FIG. 11 and FIG. 12 are views illustrating operation of a follower robot in response to user control of the tag device according to the embodiment of the present disclosure.
Figure 12:
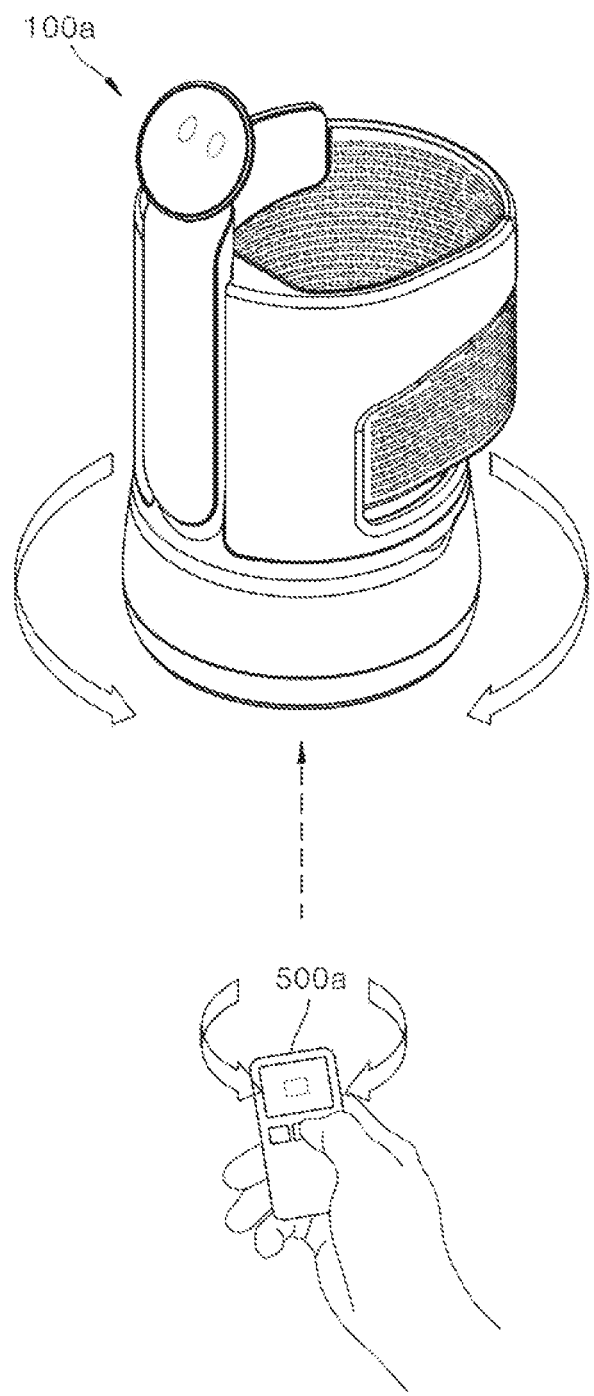

FIG. 11 and FIG. 12 are views illustrating operation of a follower robot in response to user control of the tag device according to embodiments of the present disclosure. When the follower robot 100a fails to determine the position of the tag device 500a or cannot be moved due to obstacles surrounding the follower robot 100a, the follower robot 100a may be controlled using the tag device 500a, as shown in FIG. 11 or FIG. 12.

The tag device 500a is usually carried or worn by a user. The follower robot 100a may ascertain the position of the user carrying the tag device 500a through measurement of the position of the tag device 500a. In addition, the user may control the robot through manipulation of the manipulation unit 590, such as a button attached to a tag.

In one embodiment of a control mode, the follower robot 100a may move by reflecting movement of the tag device 500a. For example, when the user shakes the tag device 500a in left and right directions, as shown in FIG. 11, the follower robot 100a also moves corresponding to leftward or rightward movement of the tag device 500a.

When a user moves the tag device 500a like drawing a circle, as shown in FIG. 12, the follower robot 100a also moves corresponding to circular movement of the tag device 500a.

In the embodiment of FIG. 11 and FIG. 12, the controller 250 of the robot 100a ascertains the posture or movement of the tag device 500a, the distance between the tag device 500a and the follower robot 100a, or the direction information of the tag device 500a using the UWB filter 217. Further, the controller 250 controls the robot 100a to move corresponding to movement of the tag device 500a. With this operation, a user can control the robot through intuitive recognition of the follower robot 100a that moves in the same manner as the tag device 500a.

When manipulation of the manipulation unit 590 (for example, button) of the tag device 500a is triggered, the controller 250 controls the position of the robot so as to maintain the distance and orientation between the robot 100a and the tag device 500a. In addition, the controller 250 may control movement of the robot so as to maintain the distance/orientation between the robot 100a and the tag device 500a corresponding to frontward/rearward, leftward/rightward or upward/downward movement of the tag device 500a.

Further, when data generated by the sensors 532, 534, 536 disposed in the tag device 500a indicate rotation of the tag device 500a, the controller 250 may rotate the robot corresponding to such rotation of the tag device.

In FIG. 11 and FIG. 12, the controller 250 of the follower robot 100a controls movement of the follower robot 100a by tracking movement information of the tag device 500a. More specifically, the controller 250 of the follower robot 100a receives the movement information of the tag device 500a and controls the moving unit 190 to maintain a predetermined distance or less with respect to the tag device 500a.

Figure 13:
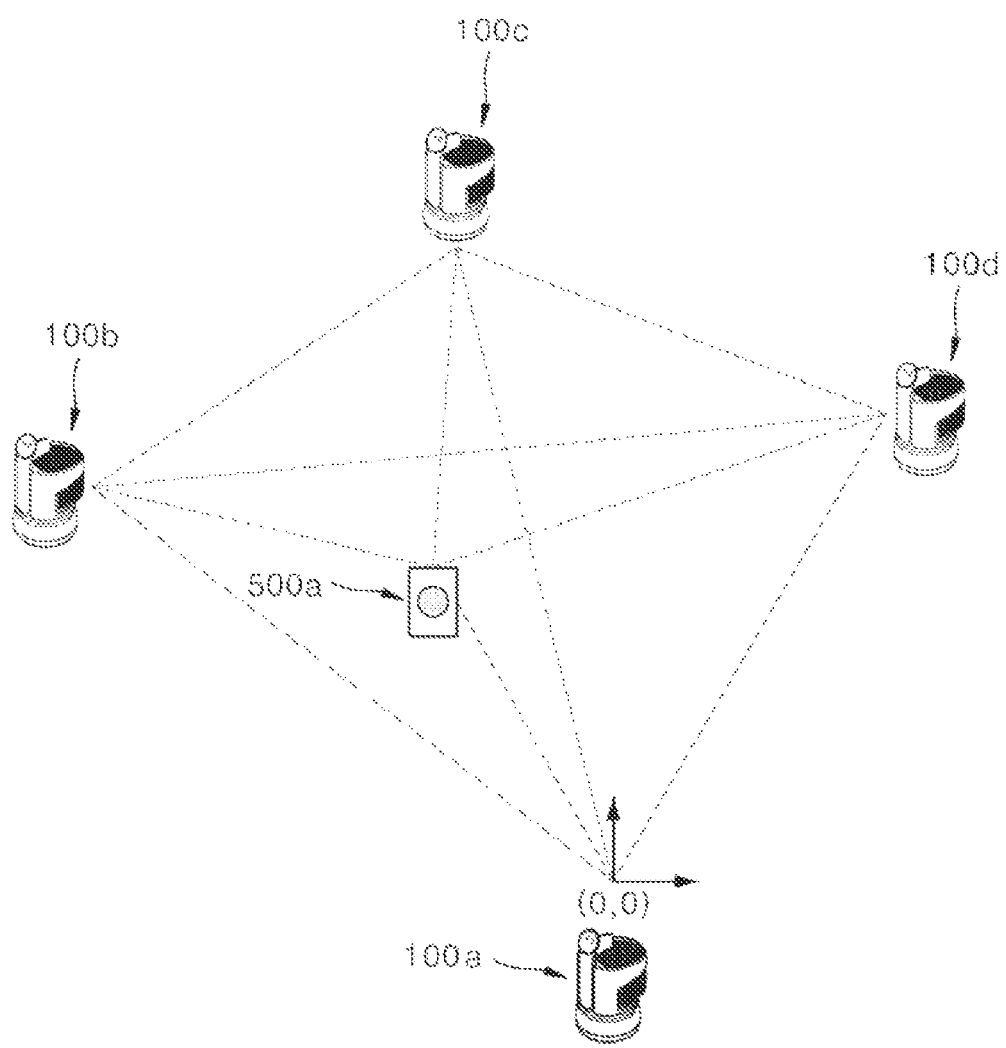
FIG. 13 is a view illustrating operation of the follower robot in a process of following a position of the tag device according to one embodiment of the present disclosure.

FIG. 13 is a view illustrating operation of the follower robot in a process of following a position of the tag device according to the embodiment of the present disclosure. Referring to FIG. 13, the tag device 500a and the follower robot 100a are disposed. The follower robot 100a follows the tag device 500a carried by a user.

Further, two or more crowd robots 100b, 100c, 100d in addition to the follower robot 100a may be paired with the tag device 500a through Bluetooth communication. Accordingly, pairing is automatically carried out depending upon the distances between the crowd robots 100b, 100c, 100d and the tag device 500a, thereby enabling simultaneous connection of a predetermined number or more of robots to the tag device.

For example, the tag device 500a may maintain connection with up to N devices using the intensity or quality (signal quality such as SNR of BLE RSSI) of signals of Bluetooth packets sent from a plurality of crowd robots. In addition, the tag device 500a may supply BLE RSSI information to the follower robot 100a or may directly estimate the position of the tag device 500a based on the positions of the plural crowd robots and BLE RSSI.

Obviously, the follower robot 100a may also estimate the position of the tag device 500a based on the positions of the plural crowd robots and RSSI of Bluetooth packets received by the tag device 500a.

For example, the controller 250 of the follower robot 100a sets (0, 0) as the coordinates of the follower robot 100a and unknown values (x_i, y_i) as the coordinates of each of the crowd robot and the coordinates of the tag device 500a.

Further, the controller 250 of the follower robot 100a calculates numerical estimates with respect to all unknown values using the measured distances to calculate a position estimate of the tag device 500a, and follows the tag device 500a using the position estimate of the tag device.

That is, the controller 250 of the follower robot 100a may calculate the position of the tag device 500a using at least one selected from the group of position information of the plural crowd robots 100b to 100d and Bluetooth RSSI information (intensity information).

Figure 14:
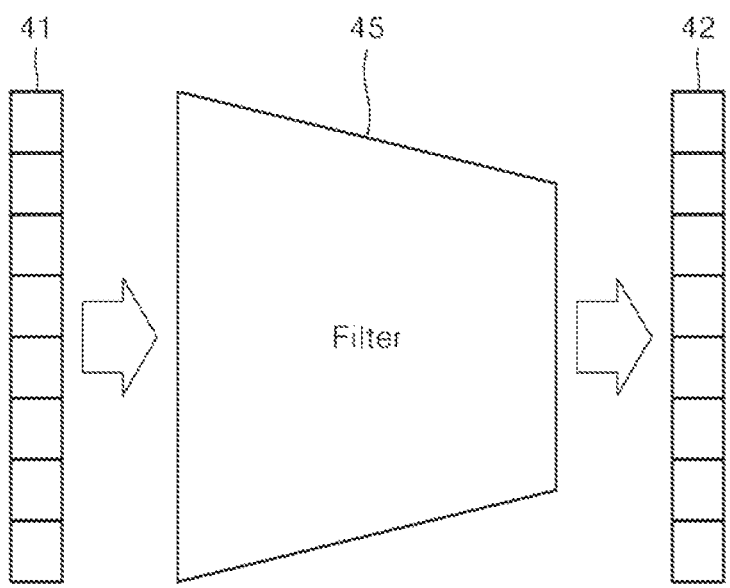
FIG. 14 is a diagram illustrating a process of converting arrangement of position information into coordinate arrangement according to one embodiment of the present disclosure.

FIG. 14 is a diagram illustrating a process of converting arrangement of position information into coordinate arrangement according to one embodiment of the present disclosure. The controller 250 of the follower robot 100a arranges distance information as indicated by Reference numeral 41 using unknown values (x_i, y_i) as the coordinates of each crowd robot and the coordinates of the tag device 500a. Further, coordinate arrangement 42 is calculated by inputting these values to the filter 45. Here, the filter 45 may be a least squares filter (LSF), a regression filter (RF), a Kalman filter, or a deep neural network.

In this embodiment, a tracking robot adapted to move following a user employs UWB RTLS technology for tracking a user position, in which Bluetooth communication is used in order to improve accuracy in tracking of the user position.

In this case, other robots are used as a kind of anchor instead of installing a separate UWB anchor in an environment where robots travel. Such a configuration reduces installation costs of the UWB anchor and removes an error in position measurement due to obstacles between the robots and the tag device. As a result, it is possible to improve reliability in position tracking through removal of a signal quality problem.

The embodiments of the present disclosure may be applied to the tracking robot, such as a delivery robot, a cart robot, and the like, which moves following a user, to improve reliability in tracking a user position.

On the other hand, the follower robot 100a can calculate the position information with high accuracy in the course of performing SLAM or tracking the position of the tag device. In addition, the follower robot 100a may store the position information of the crowd robots or the intensity information of signals for estimation of the position. It is possible to repetitively improve accuracy in position tracking by learning the stored information through an artificial intelligence module.

To this end, the controller 250 includes an artificial intelligence unit. This is a kind of learning processor and can process the position information cumulatively stored in the robot 100, the information obtained by the sensors, and numerical values with respect to accuracy in position tracking.

Artificial intelligence refers to a field of researching artificial intelligence or researching methodologies for creating artificial intelligence, and machine learning refers to a field of defining various problems in the field of artificial intelligence and researching methodologies for solving the problems. The machine learning is defined as an algorithm that improves the performance of a task through consistent experiences with the task.

An artificial neural network (ANN) is a model used in machine learning and may refer to any kind of model having a problem-solving capability, the model being composed of artificial neurons (nodes) forming a network by a combination of synapses. The ANN may be defined by a connection pattern between neurons in different layers, a learning process for updating model parameters, and an activation function for generating an output value.

The ANN may include an input layer and an output layer. Optionally, the ANN may further include one or more hidden layers. Each layer may include one or more neurons, and the ANN may include synapses for connecting the neurons. In the ANN, each neuron may output function values of the activation function associated with input signals, weights, and deflections that are received through the synapses.

The model parameters refer to parameters determined through learning and include synapse connection weights, neuron deflections, etc. Also, hyperparameters refer to parameters to be set before learning in a machine learning algorithm and includes a learning rate, the number of repetitions, a minimum placement size, an initialization function, etc.

The training purpose of the ANN can be regarded as determining model parameters that minimize a loss function. The loss function may be used as an index for determining an optimal model parameter during the learning process of the ANN.

The machine learning may be classified as supervised learning, unsupervised learning, or reinforcement learning depending on the learning scheme.

The supervised learning may refer to a method of training the ANN while a label for learning data is given, and the label may refer to an answer (or a result value) to be inferred by the ANN when the learning data is input to the ANN. The unsupervised learning may refer to a method of training the ANN while the label for the learning data is not given. The reinforcement learning may refer to a learning method for training an agent defined in any embodiment to select an action or a sequence of actions that maximizes cumulative reward in each state.

Machine learning implemented using a deep neural network (DNN) including a plurality of hidden layers in the ANN will be called deep learning, and the deep learning is a portion of the machine learning. In the following description, the machine learning is used as a meaning including the deep learning.

For the robot 100, the artificial intelligence unit 255 of sub element of controller 250 may perform an artificial intelligence function.

In this case, the communication unit 280 of the robot 100 may transmit or receive data to or from external apparatuses such as the AI server 700, which will be described in FIG. 15, or a robot for providing another artificial intelligence function through wired and wireless communication technologies. For example, the communication unit 280 may transmit or receive sensor information, user inputs, learning models, controls signals, and the like to or from external apparatuses.

In this case, the communication technology used by the communication unit 280 includes Global System for Mobile Communication (GSM), code-division multiple access (CDMA), Long Term Evolution (LTE), 5G, Wireless LAN (WLAN), Wireless-Fidelity (Wi-Fi), Bluetooth™, Radio-Frequency Identification (RFID), Infrared Data Association (IrDA), ZigBee, Near Field Communication (NFC), and the like The interface unit 230 may acquire various kinds of data.

In this case, the interface unit 230 may include a camera for receiving an image signal input, a microphone for receiving an audio signal, a user input unit for receiving information from a user, etc. Here, information acquired by the obstacle sensor 220, the camera sensor 260, or the microphone refers to sensing data, sensor information, etc.

The interface unit 230, various kinds of sensors 220 260, the wheel encoder 260 of moving unit 190, and the like may acquire input data or the like to be used when an output is acquired using a learning model and learning data for learning a model. The aforementioned elements may acquire raw input data. In this case, the controller 250 or the artificial intelligence unit may extract an input feature as a preprocessing process for the input data.

The artificial intelligence unit may train a model composed of an ANN using learning data. Here, the trained ANN may be called a learning model. The learning model may be used to infer a result value not for the learning data but for new input data, and the inferred value may be used as a determination basis for the robot 100 to perform a certain operation.

In this case, the artificial intelligence unit may perform artificial intelligence processing along with the learning processor 740 of the AI server 700.

In this case, the artificial intelligence unit may include a memory integrated or implemented in the robot 100. Alternatively, the artificial intelligence unit may be implemented using a separate memory, an external memory coupled to the robot 100, or a memory held in an external apparatus.

The robot 100 acquires at least one of internal data of the robot 100, surrounding environmental data of the robot 100, and user information using various sensors.

Here, examples of the sensors included in the robot 100 include a proximity sensor, an illuminance sensor, an acceleration sensor, a magnetic sensor, a gyro sensor, an inertia sensor 270, an RGB sensor, an IR sensor, a fingerprint recognition sensor, an ultrasonic sensor, an optical sensor, a microphone, a LADAR sensor, an obstacle sensor 220, a camera sensor 260, and a radar.

The interface unit 230 generates an output associated with a visual sense, an auditory sense, or a haptic sense.

The interface unit 230 includes a display unit that outputs visual information, a speaker that outputs auditory information, and a haptic module that outputs haptic data.

A memory built in the robot 100 store data for supporting various functions of the robot 100. For example, the memory can store input data, learning data, learning models, and learning histories which are acquired by various sensors and the interface unit 230 which are built in the robot 100.

The controller 250 can determine at least one executable operation of the robot 100 on the basis of information which is determined or generated using a data analysis algorithm or a machine learning algorithm. The controller 250 can perform the determined operation by controlling the elements of the robot 100.

For this purpose, the controller 250 can request, retrieve, receive, or utilize data in the artificial intelligence unit or the memory, and control the elements of the robot 100 such that a predicted operation or an operation determined to be preferable out of one or more executable operations is executed.

When cooperation with an external device is required for executing the determined operation, the controller 250 can generate a control signal for controlling the external device and transmit the generated control signal to the external device.

The controller 250 can acquire intention information from a user input and determine requirements of the user on the basis of the acquired intention data.

The controller 250 can acquire intention information corresponding to a user input using at least one or more of a speech-to-text (STT) engine for converting a speech input to text and a natural language process (NLP) engine for acquiring intention information in a natural language.

At least one of the STT engine and the NLP engine can be constituted by an artificial neural network in accordance with a machine learning algorithm. At least one of the STT engine and the NLP engine may be an engine which has learned by the artificial intelligence unit, an engine which has learned by the learning process 740 of the AI server 700, or an engine which has learned by distributed processes thereof.

The controller 250 can collect history information including operation details of the robot 100 or feedback of a user which is used for the operation and store the collected history information in the memory or the artificial intelligence unit or transmit the collected history information to an external device such as the AI server 700. The collected history information can be used to update a learning model.

The controller 250 can control at least a part of the elements of the robot 100 in order to drive an application program stored in the memory 170. In addition, the controller 250 can allow two or more of the elements of the robot 100 to operate in combination in order to drive an application program.

Alternatively, an independent artificial intelligence server (an AI server) communicating with the robot 100 may be provided and process information which is provided by the robot 100.

Figure 15:
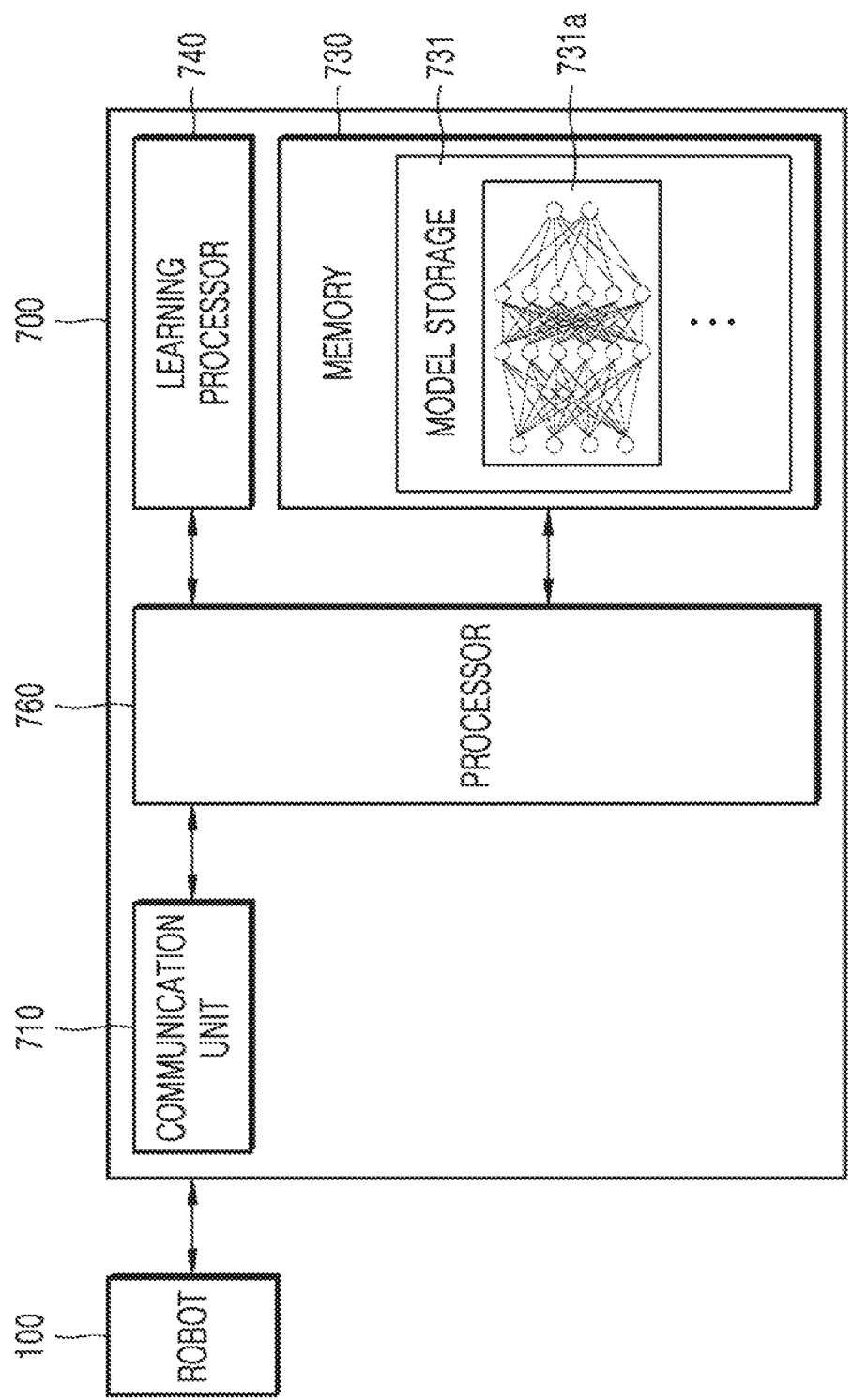
FIG. 15 is a block diagram illustrating configuration of an AI server according to one embodiment of the present disclosure.

FIG. 15 illustrates a configuration of an AI server according to an embodiment of the invention.

An artificial intelligence server, that is, an AI server 700, refers to a device that causes an artificial neural network to learn using a machine learning algorithm or uses a learned artificial neural network. Here, the AI server 700 may include a plurality of servers and perform distributed processes and may be defined as a 5G network. Here, the AI server 700 is provided as a part of an AI device 100 and perform at least a part of AI processing together.

The AI server 700 includes a communication unit 710, a memory 730, a learning processor 740, and a processor 760.

The communication unit 710 of the AI server 700 transmits and receives data to and from an external device such as the robot 100.

The memory 730 of the AI server 700 includes a model storage unit 731. The model storage unit 731 stores a model which is learning or learned (or an artificial neural network 231*a*) via the learning processor 740.

The learning processor 740 of the AI server 700 causes the artificial neural network 231*a* to learn using learning data. A learning model may be used in a state in which it is mounted in the AI server 700 of an artificial neural network or may be used in a state in which it is mounted in an external device such as the robot 100.

A learning model may be implemented in hardware, in software, or in a combination of hardware and software. When a part or the whole of a learning model is implemented in software, one or more instructions constituting the learning model can be stored in the memory 730.

The processor 760 infers a resultant value for new input data using a learning model and a response or a control command based on the inferred value When all elements of the embodiments of the invention are described to be combined into one element or to operate in combination, the invention is not limited to the embodiments and all the elements may be selectively combined to operate within the scope of the invention. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the invention can be realized. Examples of a storage medium having stored the computer program include storage mediums such as a magnetic recording medium, an optical recording medium, and a semiconductor recording medium. The computer program for realizing the embodiments of the invention includes a program module which is transmitted via an external device in real time.

While embodiments of the invention have been described above, various changes or modifications can be made thereon by those skilled in the art. Accordingly, it should be understood that such changes and modifications belong to the scope of the invention without departing from the scope of the invention.

The invention claimed is:

1. A follower robot for tracking a user position, the follower robot comprising:
 a positioning sensor configured to receive a signal based on a first protocol from a first tag device to calculate a position of the first tag device;
 a Bluetooth module configured to receive a signal based on a second protocol from the first tag device;
 an obstacle sensor configured to sense an obstacle around the follower robot; and
 a controller configured to store position information of the first tag device cumulatively, to generate a moving route corresponding to the stored position information of the first tag device, and to correct the position information of the first tag device based on position estimation information of a crowd robot around the first tag device sent from the first tag device,
 wherein the controller is further configured to move the follower robot along the moving route,
 wherein the crowd robot does not follow the first tag device which the follower robot follows, and the crowd robot follows a second tag device,
 wherein the crowd robot sends position information of the crowd robot to the first tag device, and
 wherein the follower robot sends position information of the follower robot to the second tag device.

2. The follower robot according to claim 1, wherein the positioning sensor or the Bluetooth module receives the position estimation information, and
 wherein the position estimation information comprises at least one selected from the group of movement information of the first tag device, the position information of the crowd robot, and intensity information of a signal sent based on the second protocol from the crowd robot.

3. The follower robot according to claim 2, wherein the controller controls a movement of the follower robot by tracking the movement information of the first tag device.

4. The follower robot according to claim 3, wherein the controller receives the movement information of the first tag device and controls the follower robot to maintain a predetermined distance or less with respect to the first tag device.

5. The follower robot according to claim 2, wherein the controller calculates the position of the first tag device using at least one selected from the group of the position information of the crowd robot and the intensity information.

6. The follower robot according to claim 1, wherein the first protocol is ultra-wideband (UWB),
 wherein the positioning sensor comprises a chip sending and receiving UWB signals and a UWB filter,
 wherein the positioning sensor is disposed in plural in the follower robot, and
 wherein the UWB filter estimates the position of the first tag device by reflecting movement information of the first tag device.

7. The follower robot according to claim 1, wherein the second protocol is Bluetooth,
 wherein the Bluetooth module comprises a chip sending and receiving Bluetooth signals and a Bluetooth filter, and
 wherein the Bluetooth module calculates the position information of the first tag device with respect to the crowd robot.

8. A tag device comprising:
 a positioning sensor configured to sense a signal based on a first protocol to a follower robot;
 a Bluetooth module configured to receive a signal based on a second protocol from a crowd robot and to send a signal based on the second protocol to the follower robot; and
 a tag controller configured to control the positioning sensor or the Bluetooth module such that position information sent from the crowd robot to the Bluetooth module or intensity information of the signal sent based on the second protocol from the crowd robot is sent to the follower robot,
 wherein the tag device is a first tag device, wherein the crowd robot does not follow the first tag device which the follower robot follows, and the crowd robot follows a second tag device, wherein the crowd robot sends the position information of the crowd robot to the first tag device and wherein the follower robot sends position information of the follower robot to the second tag device.

9. The tag device according to claim 8, further comprising:

a movement detection sensor configured to sense a movement of the tag device; and a tag filter configured to filter values sensed by the movement detection sensor, wherein the tag controller controls the positioning sensor or the Bluetooth module to send movement information of the tag device calculated by the tag filter to the follower robot.

10. The tag device according to claim 9, wherein the tag device is configured to receive a manipulation signal, and wherein the tag controller controls transmission of the movement information of the tag device under the manipulation signal.

11. A method of tracking a user position by a follower robot using a crowd robot, the method comprising:

measuring a position of a first tag device, by a positioning sensor, in response to a signal received from the first tag device based on a first protocol;

receiving, by a Bluetooth module, a signal from the first tag device based on a second protocol;

cumulatively storing, by a controller, position information of the first tag device, followed by generating a moving route corresponding to the stored position information of the first tag device;

correcting, by the controller, the position information of the first tag device based on position estimation information of the crowd robot around the first tag device sent from the first tag device; and moving, by the controller, the follower robot along the moving route, wherein the crowd robot does not follow the first tag device which the follower robot follows, and the crowd robot follows a second tag device, wherein the crowd robot sends position information of the crowd robot to the first tag device, and wherein the follower robot sends position information of the follower robot to the second tag device.

12. The method according to claim 11, further comprising:

receiving, by the positioning sensor or the Bluetooth module, the position estimation information, wherein the position estimation information comprises at least one selected from the group of movement information of the first tag device, the position information of the crowd robot, and intensity information of a signal sent based on the second protocol from the crowd robot.

13. The method according to claim 12, further comprising:

controlling, by the controller, a movement of the follower robot by tracking the movement information of the first tag device.

14. The method according to claim 13, further comprising:

receiving, by the controller, the movement information of the first tag device; and controlling the follower robot to maintain a predetermined distance or less with respect to the first tag device.

15. The method according to claim 12, further comprising:

calculating, by the controller, the position of the first tag device using at least one selected from the group of the position information of the crowd robot and the intensity information.

16. The method according to claim 11, wherein the first protocol is ultra-wideband (UWB), wherein the positioning sensor comprises a chip sending and receiving UWB signals and a UWB filter, wherein the positioning sensor is disposed in plural in the follower robot, and wherein the method further comprises estimating, by the UWB filter, the position of the first tag device by reflecting movement information of the first tag device.

17. The method according to claim 11, wherein the second protocol is Bluetooth, wherein the Bluetooth module comprises a chip sending and receiving Bluetooth signals and a Bluetooth filter, and wherein the method further comprises calculating, by the Bluetooth module, the position information of the first tag device with respect to the crowd robot.

18. The method according to claim 11, wherein the receiving the signal based on the second protocol comprises receiving, by the first tag device, the signal based on the second protocol from the crowd robot.

19. The method according to claim 18, wherein the first tag device comprises a movement detection sensor sensing a movement of the first tag device and a tag filter filtering values sensed by the movement detection sensor, and wherein the receiving the signal based on the second protocol further comprises receiving, by the Bluetooth module, movement information of the first tag device calculated by the tag filter and sent from the first tag device.

20. The method according to claim 19, further comprising:

receiving a manipulation signal, wherein the receiving the signal based on the second protocol further comprises receiving, by the Bluetooth module, the movement information of the first tag device sent from the first tag device in response to the received manipulation signal of the first tag device.

* * * * *